United States Patent
Perold et al.

(10) Patent No.: US 9,965,728 B2
(45) Date of Patent: May 8, 2018

(54) ATTENDANCE AUTHENTICATION AND MANAGEMENT IN CONNECTION WITH MOBILE DEVICES

(71) Applicant: Element, Inc., New York, NY (US)

(72) Inventors: Adam Perold, New York, NY (US); Daniel Abrams, New York, NY (US)

(73) Assignee: ELEMENT, INC., New York, NY (US)

( * ) Notice: Subject to any disclaimer, the term of this patent is extended or adjusted under 35 U.S.C. 154(b) by 0 days. days.

(21) Appl. No.: 14/730,166

(22) Filed: Jun. 3, 2015

(65) Prior Publication Data

US 2015/0350225 A1    Dec. 3, 2015

Related U.S. Application Data

(60) Provisional application No. 62/007,337, filed on Jun. 3, 2014.

(51) Int. Cl.
| | |
|---|---|
| *G06Q 10/02* | (2012.01) |
| *H04W 4/02* | (2018.01) |
| *H04W 4/00* | (2018.01) |
| *H04L 29/06* | (2006.01) |
| *H04W 12/06* | (2009.01) |

(52) U.S. Cl.
CPC ........ *G06Q 10/02* (2013.01); *H04L 63/0861* (2013.01); *H04W 4/008* (2013.01); *H04W 4/02* (2013.01); *H04W 4/80* (2018.02); *H04W 12/06* (2013.01)

(58) Field of Classification Search
CPC ... G06Q 10/02; H04L 63/0861; H04W 4/008; H04W 4/02; H04W 12/06
See application file for complete search history.

(56) References Cited

U.S. PATENT DOCUMENTS

| | | | |
|---|---|---|---|
| 3,733,861 | A | 5/1973 | Lester |
| 4,371,951 | A | 2/1983 | Kort et al. |
| 5,067,164 | A | 9/1991 | Denker et al. |
| 5,058,179 | A | 10/1991 | Denker et al. |

(Continued)

FOREIGN PATENT DOCUMENTS

| | | |
|---|---|---|
| EP | 0049039 B1 | 7/1984 |
| EP | 2192526 A2 | 2/2010 |

(Continued)

OTHER PUBLICATIONS

Boureau et al., A theoretical analysis of feature pooling in visual recognition. Proceedings of the 27th International Conference on Machine Learning. 2010; 111-118.

(Continued)

*Primary Examiner* — Oleg Korsak
(74) *Attorney, Agent, or Firm* — Wilson Sonsini Goodrich & Rosati

(57) ABSTRACT

System and method for single-action time and attendance record generation and processing via computing devices. The record is generated via a computing device ("Client System") and received by a server system or other computing device ("Server System"). The user utilizes the Client System to execute a simultaneous or near-simultaneous process of authenticating his or her identity, recording time data and location data, and then sending this data to the server system.

14 Claims, 4 Drawing Sheets

(56) References Cited

U.S. PATENT DOCUMENTS

| | | |
|---|---|---|
| 5,450,523 A | 9/1995 | Zhao |
| 5,774,059 A | 6/1998 | Henry et al. |
| 5,867,802 A | 2/1999 | Borza |
| 6,274,745 B1 | 8/2001 | Inanaga et al. |
| 6,633,090 B2 | 10/2003 | Harter et al. |
| 6,923,370 B2 | 8/2005 | Gotfried et al. |
| 6,992,562 B2 | 1/2006 | Fuks et al. |
| 7,218,761 B2 | 5/2007 | McClurg et al. |
| 7,660,442 B2 | 2/2010 | Sweeney et al. |
| 8,026,840 B2 | 9/2011 | Dwelly et al. |
| 8,064,645 B1 | 11/2011 | Sezille |
| 8,160,307 B2 | 4/2012 | Polcha et al. |
| 8,194,938 B2 | 6/2012 | Wechsler et al. |
| 8,638,939 B1 | 1/2014 | Casey et al. |
| 8,965,287 B2 | 2/2015 | Lam |
| 9,002,586 B2 | 4/2015 | Feit |
| 9,003,196 B2 | 4/2015 | Hoyos et al. |
| 9,111,402 B1* | 8/2015 | Krishnan ............ G07C 9/00158 |
| 2004/0017934 A1 | 1/2004 | Kocher |
| 2006/0120568 A1* | 6/2006 | McConville ........ G07C 9/00111 |
| | | 382/115 |
| 2006/0294393 A1 | 12/2006 | McCall |
| 2008/0002860 A1 | 1/2008 | Super et al. |
| 2008/0091952 A1 | 4/2008 | Sumner et al. |
| 2008/0263681 A1 | 10/2008 | Dooms et al. |
| 2008/0284726 A1 | 11/2008 | Boillot |
| 2008/0296364 A1 | 12/2008 | Pappas et al. |
| 2009/0001160 A1 | 1/2009 | Davis et al. |
| 2009/0175506 A1 | 7/2009 | Polcha et al. |
| 2009/0249478 A1 | 10/2009 | Rosener et al. |
| 2009/0297032 A1 | 12/2009 | Loui et al. |
| 2010/0030698 A1 | 2/2010 | Goodin |
| 2010/0042940 A1* | 2/2010 | Monday ............... G09B 29/106 |
| | | 715/764 |
| 2010/0046830 A1 | 2/2010 | Wang et al. |
| 2010/0127827 A1 | 5/2010 | Watanabe |
| 2010/0128936 A1 | 5/2010 | Baughman |
| 2010/0148923 A1 | 6/2010 | Takizawa |
| 2010/0191551 A1 | 7/2010 | Drance et al. |
| 2010/0246902 A1 | 9/2010 | Rowe et al. |
| 2011/0119734 A1 | 5/2011 | Crawford et al. |
| 2011/0229045 A1 | 9/2011 | Yu |
| 2011/0270712 A1 | 11/2011 | Wood et al. |
| 2012/0046862 A1* | 2/2012 | Griffin ................... G01C 21/20 |
| | | 701/521 |
| 2012/0128936 A1 | 5/2012 | Imajima et al. |
| 2012/0137137 A1 | 5/2012 | Brickell et al. |
| 2012/0162385 A1 | 6/2012 | Park et al. |
| 2013/0099892 A1 | 4/2013 | Tucker et al. |
| 2013/0222835 A1 | 8/2013 | Iwamoto et al. |
| 2013/0227651 A1 | 8/2013 | Schultz et al. |
| 2013/0268418 A1 | 10/2013 | Sardi et al. |
| 2013/0290154 A1 | 10/2013 | Cherry et al. |
| 2013/0294642 A1 | 11/2013 | Wang et al. |
| 2013/0311866 A1 | 11/2013 | Herold |
| 2014/0013252 A1 | 1/2014 | Ehrler et al. |
| 2014/0037134 A1 | 2/2014 | Tong et al. |
| 2014/0068740 A1 | 3/2014 | Lecun et al. |
| 2014/0072185 A1 | 3/2014 | Dunlap et al. |
| 2014/0366113 A1 | 12/2014 | Lecun et al. |
| 2015/0010145 A1 | 1/2015 | Iwashita et al. |
| 2015/0039892 A1 | 2/2015 | Fujita et al. |
| 2015/0348214 A1* | 12/2015 | Jain ...................... G06Q 40/125 |
| | | 705/14.58 |

FOREIGN PATENT DOCUMENTS

| | | |
|---|---|---|
| JP | 2002032343 A | 1/2002 |
| JP | 2002259345 A | 9/2002 |
| JP | 2006259923 A | 9/2006 |
| JP | 2008242631 A | 10/2008 |
| JP | 2010128822 A | 6/2010 |
| JP | 2010146502 A | 7/2010 |
| WO | WO-2009013526 A1 | 1/2009 |
| WO | WO-2012020591 A1 | 2/2012 |
| WO | WO-2014039732 A2 | 3/2014 |
| WO | WO-2015187882 A1 | 12/2015 |

OTHER PUBLICATIONS

Cortes et al., Support-vector networks. Machine Learning. 1995; 20:273-297.

Dalal et al., Histograms of oriented gradients for human detection. Proceedings of the 2005 IEEE Computer Society Conference on Computer Vision and Pattern Recognition. 2005; 1:886-893.

Lecun et al., Convolutional networks and applications in vision. Proceedings of IEEE International Symposium on Circuits and Systems. 2010; 253-256.

Lecun et al., Gradient-based learning applied to document recognition. Proceedings of the IEEE. Nov. 1998; 86(11):2278-2324.

Lowe, D. Distinctive image features from scale-invariant key points. International Journal of Computer Vision. 2004; 60(2):91-110.

PCT/US2013/058343 International Search Report dated Mar. 13, 2014.

PCT/US2013/058343 IPRP dated Mar. 19, 2015.

PCT/US2015/030586 International Search Report and Written Opinion dated Aug. 20, 2015.

PCT/US2015/034077 International Search Report and Written Opinion dated Sep. 30, 2015.

Sermanet et al., Pedestrian detection with unsupervised multi-stage feature learning. Proceedings of the IEEE Conference on Computer Vision and Pattern Recognition. Jun. 2013; 3626-3633.

U.S. Appl. No. 14/019,512 Office Action dated Nov. 6, 2014.

U.S. Appl. No. 14/449,730 Final Office Action dated Apr. 30, 2015.

U.S. Appl. No. 14/449,730 Office Action dated Nov. 18, 2014.

Viola et al., Rapid object detection using a boosted cascade of simple features. Proceedings of the 2001 IEEE Computer Society Conference on Computer Vision and Pattern Recognition. 2001; 1:I-511-I-518.

ARIPO Patent Application No. AP/P/2015/008348 Examination Report dated Apr. 27, 2016.

Mexican Patent Application No. MX/a/2015/002841 Office Action dated Jun. 15, 2016.

U.S. Appl. No. 14/449,730 Office Action dated Mar. 31, 2016.

Boult et al. Revocable fingerprint biotokens: Accuracy and security analysis. 2007 IEEE Conference on Computer Vision and Pattern Recognition, 2007, 8 pages.

Han et al., Palmprint recognition based on directional features and graph matching. Advances in Biometrics: ICB 2007, 4642:1164-1173, 2007.

PCT/US2015/030586 International Preliminary Report on Patentability dated Nov. 24, 2016.

PCT/US2015/034077 International Preliminary Report on Patentability dated Dec. 15, 2016.

Singapore Patent Application No. 11201501691V Second Written Opinion dated Aug. 7, 2016.

U.S. Appl. No. 14/711,664 Office Action dated Sep. 30, 2016.

U.S. Appl. No. 14/711,664 Office Action dated Apr. 7, 2017.

U.S. Appl. No. 14/449,730 Office Action dated May 30, 2017.

Chinese Patent Application No. 201380055691.9 First Office Action dated Jul. 3, 2017.

Eurasian Patent Application No. 201590485 Office Action dated Sep. 19, 2017.

European Patent Application No. 13834699.4 Communication dated Aug. 17, 2017

Israel Patent Application No. 237556 Office Action dated Oct. 30, 2017.

Japanese Patent Application No. 2015-531210 second Office Action dated Sep. 11, 2017.

Japanese Patent Publication No. JP 10-177650 dated Jun. 30, 1998 (Cited in the Office Action for Japanese Patent Application No. 2015-531210).

U.S. Appl. No. 14/449,730 Office Action dated Oct. 18, 2017.

* cited by examiner

ATTENDANCE AUTHENTICATION AND MANAGEMENT IN CONNECTION WITH MOBILE DEVICES

CROSS-REFERENCE TO RELATED APPLICATIONS

This application claims the benefit of the U.S. Provisional Patent Application No. 62/007,337, filed Jun. 3, 2014, the entire disclosure of which is hereby incorporated herein by reference.

BACKGROUND OF THE INVENTION

The ability to remotely authenticate identity, time, and location has become increasingly important due to the growth of mobile workforces in an increasingly inter-connected global economy, the prevalence of mobile and stationary computing devices around the world, the ability to measure a diversity of data via the sensors of modern computing devices, and the ability to transmit this data wirelessly and communicate across devices.

The time and attendance management for a person (e.g., a worker, a waiter, a guest, an accountant, a lawyer, a facilities maintenance professional, an attendant, a driver, etc.) across a variety of premises (e.g., an office, a store, a factory, a warehouse, an automobile, a building, a government agency, a mine, etc.) which themselves may change over time is an important task for both an enterprise and the personnel themselves. In one aspect, a time and attendance record may only can be generated and submitted by an authenticated person. In another aspect, the amount of time that an authenticated person works at a designated location has to be recorded and controlled. The management can be for various purposes, such as payroll, security, activity measurement, working hour control, etc. However, without a reliable system or tools for precise time and attendance management, errors frequently occur and both financial and operational costs are incurred. When an error takes place in a payroll system, an employee incurs an inaccurate pay. When an error occurs in a high security environment, the security control may be compromised, creating both financial and human risks. Moreover, empowering end users with a more elegant solution to this important activity can greatly increase the productivity of mobile workforces and lead to greater personal happiness in everyday workflow.

SUMMARY OF THE INVENTION

The subject matter disclosed herein is a system and method for time and attendance management that automatically combines modern mobile computing hardware and software to provide a one-click solution to a difficult problem. The present technology utilizes secure authentication, and specifically comprises the measurement, processing and transmittal of identity, time, and location data via computing devices and a communications network.

The ability to remotely authenticate identity, time, and location has become increasingly important due to the growth of mobile workforces in an increasingly inter-connected global economy, the prevalence of mobile and stationary computing devices around the world, the ability to measure a diversity of data via the sensors of modern computing devices, and the ability to transmit this data wirelessly and communicate across devices.

A key aspect of the system and method described is the ability to provide a single-action time and attendance system to reduce the number of actions needed to record time and attendance, providing a critical productivity advancement for on-the-go mobile workforces who often find it difficult to enter and manage multi-action instructions on computing devices, as can especially be the case with touchscreen smartphones.

In one aspect, disclosed herein is a computing system of authenticating and processing time and attendance used by a mobile end user, the system comprising: (a) a mobile processor, a memory module and a mobile operating system configured to perform executable instructions; (b) a sensor configured to measure and record a first set of time and attendance data from the mobile end user, the time and attendance data comprising: (1) an identity of the mobile end user, (2) a time of authentication, (3) a geo-location, and (4) ancillary information associated with time and attendance for cost coding or record retention; and (c) a communication module configured to send the first set of the time and attendance data to a database in a server. In some embodiments, the ancillary information comprises a note or a tag. In some embodiments, the server is configured to verify the time and attendance data based on a clock of the server. In some embodiments, the system completes time and attendance authentication of the mobile end user without requesting the mobile end user to actively execute an identifying step, the identifying step comprising one or more of: (a) submitting a name, (b) entering a passcode, (c) swiping a keycard, (d) providing one or more biometric signatures, and (e) submitting a form of identity. In some embodiments, the system further comprises a display configured to display the time and attendance data to the mobile end user. In some embodiments, the system further comprises a camera configured to record biometric information of the mobile end user by taking one or more biometric photographs. In some embodiments, the display is further configured to indicate an action, the action comprising one or more of the following: (a) recording the biometric information of the mobile end user in a simultaneous or near-simultaneous or asynchronous recording and transmittal of a second set of the time and attendance data, (b) pressing a button or touching the display, and (c) speaking one or more sounds. In some embodiments, the executable instructions comprise a determination of the mobile end user being correctly within premises for a time and attendance purpose, the determination comprising: (a) capturing geo-location data comprising free-form geographic coordinates representing a location in the world, and (b) comparing the geo-location data to permitted geo-location data, either locally on the system, or remotely via transmission of the geo-location data to the server. In some embodiments, the permitted geo-location data is provisioned by an additional party in a process comprising: (a) entering of the permitted geo-location data into the database; (b) syncing of the permitted geo-location data with the system. In some embodiments, entering of the permitted geo-location data comprises entering of one or more geographic coordinate points on a digital map on a computer terminal to form a shape encompassing a target area for the permitted geo-location data. In some embodiments, the permitted geo-location data is updated with a new set of permitted geo-location data and synced real-time with the system, providing a configurable and changing permitted premises for time and attendance authentication. In some embodiments, the determination of the mobile end user being correctly within the premises for the time and attendance purpose further comprises: comparing a proximity of the mobile end user to a permitted user, via geo-location data of two users' mobile devices, or via short-range wireless communication between the two users' mobile devices, enabling a sufficient determination of a permitted proximity. In some embodiments, the determination of the mobile end user being correctly within the premises for the time and attendance purpose further comprises: comparing a proximity of the mobile end user to a permitted sensory device, via geo-location data of the system and the permitted sensory device, or via short-range wireless communication between the mobile end user and the permitted sensory device, enabling a sufficient determination of permitted proximity. In some embodiments, the geo-location data: (a) is created via a clock of the mobile end-use for the time and attendance purpose automatically, and (b) creates a geo-fence perimeter around the mobile end user, wherein the mobile end user is allowed to clock out simply by physically exiting outside geographic coordinates defined by the geo-fence perimeter, without having to actively enter his or her clock out instructions. In some embodiments, the geo-location data creates a geo-fence perimeter around the mobile end user, wherein the mobile end user is allowed to clock out simply by physically exiting specific geo-location based conditions without having to actively enter his or her clock out instructions, including but not limited to: (a) exiting outside geographic coordinates defined by a geo-fence perimeter; (b) exiting outside the wireless signal range of a sensory device; (c) exiting beyond a predefined distance from another mobile device as measured by a signal between the devices. In some embodiments, the geo-location is checked at a regular interval or at a random interval, the checking of the location executed as part of an anti-spoofing process to ensure the mobile user remains compliant with a premises requirement based on one or more of the following: a time-denominated rule, and a location-denominated rule. In some embodiments, the server comprises a smartphone, a tablet or a notebook, a stationary computing device, or a desktop. In some embodiments, the time and attendance data is synchronized with a database in a third computing device. In some embodiments, the third computing device comprises a manager of a workforce, the manager allowing a user of the third computing device to perform one or more of the following: (a) viewing the time and attendance data; (b) communicating directly with the mobile end user; and (c) triggering a time and attendance authentication directly to the mobile end user. In some embodiments, the time and attendance data is real-time updated or regularly-updated.

In another aspect, disclosed herein includes a method of authenticating and processing time and attendance implemented by a mobile computing system and used by a mobile end user, the method comprising: (a) measuring and recording, by a sensor, a first set of time and attendance data from the mobile end user, the time and attendance data comprising: (1) an identity of the mobile end user, (2) a time of authentication, (3) a geo-location, and (4) ancillary information associated with time and attendance for cost coding or record retention; and (b) sending, by a communication module, the first set of the time and attendance data to a database in a server. In some embodiments, the ancillary information comprises a note or a tag. In some embodiments, the server is configured to verify the time and attendance data based on a clock of the server. In some embodiments, the method further comprises completing time and attendance authentication of the mobile end user without requesting the mobile end user to actively execute an identifying step, the identifying step comprising one or more of: (a) submitting a name, (b) entering a passcode, (c) swiping a keycard, (d) providing one or more biometric signatures, and (e) submitting a form of identity. In some embodiments, the method further comprises displaying, by a display, the time and attendance data to the mobile end user. In some embodiments, the method further comprises recording, by a camera, biometric information of the mobile end user by taking one or more biometric photographs. In some embodiments, the display is further configured to indicate an action, the action comprising one or more of the following: (a) recording the biometric information of the mobile end user in a simultaneous or near-simultaneous or asynchronous recording and transmittal of a second set of the time and attendance data, (b) pressing a button or touching the display, and (c) speaking one or more sounds. In some embodiments, the method further comprises determining the mobile end user being correctly within premises for a time and attendance purpose, the determination comprising: (a) capturing geo-location data comprising free-form geographic coordinates representing a location in the world, and (b) comparing the geo-location data to permitted geo-location data, either locally on the system, or remotely via transmission of the geo-location data to the server. In some embodiments, the permitted geo-location data is provisioned by an additional party in a process comprising: (a) entering of the permitted geo-location data into the database; (b) syncing of the permitted geo-location data with the system. In some embodiments, entering of the permitted geo-location data comprises entering of one or more geographic coordinate points on a digital map on a computer terminal to form a shape encompassing a target area for the permitted geo-location data. In some embodiments, the permitted geo-location data is updated with a new set of permitted geo-location data and synced real-time with the system, providing a configurable and changing permitted premises for time and attendance authentication. In some embodiments, determining the mobile end user being correctly within the premises for the time and attendance purpose further comprises: comparing a proximity of the mobile end user to a permitted user, via geo-location data of two users' mobile devices, or via short-range wireless communication between the two users' mobile devices, enabling a sufficient determination of a permitted proximity. In some embodiments, the determining the mobile end user being correctly within the premises for the time and attendance purpose further comprises: comparing a proximity of the mobile end user to a permitted sensory device, via geo-location data of the system and the permitted sensory device, or via short-range wireless communication between the mobile end user and the permitted sensory device, enabling a sufficient determination of permitted proximity. In some embodiments, the geo-location data: (a) is created via a clock of the mobile end-use for the time and attendance purpose automatically, and (b) creates a geo-fence perimeter around the mobile end user, wherein the mobile end user is allowed to clock out simply by physically exiting outside geographic coordinates defined by the geo-fence perimeter, without having to actively enter his or her clock out instructions. In some embodiments, geo-location data creates a geo-fence perimeter around the mobile end user, wherein the mobile end user is allowed to clock out simply by physically exiting specific geo-location based conditions without having to actively enter his or her clock out instructions, including but not limited to: (a) exiting outside geographic coordinates defined by a geo-fence perimeter; (b) exiting outside the wireless signal range of a sensory device; (c) exiting beyond a predefined distance from another mobile device as measured by a signal between the devices. In some embodiments, the geo-location is checked at a regular interval or at a random interval, the checking of the location executed as part of an anti-spoofing process to ensure the mobile user remains compliant with a premises requirement based on one or more of the following: a time-denominated rule, and a location-denominated rule. In some embodiments, the server comprises a smartphone, a tablet or a notebook, a stationary computing device, or a desktop. In some embodiments, the time and attendance data is synchronized with a database in a third computing device. In some embodiments, the third computing device comprises a manager of a workforce, the manager allowing a user of the third computing device to perform one or more of the following: (a) viewing the time and attendance data; (b) communicating directly with the mobile end user; and (c) triggering a time and attendance authentication directly to the mobile end user. In some embodiments, the time and attendance data is real-time updated or regularly-updated.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1A:
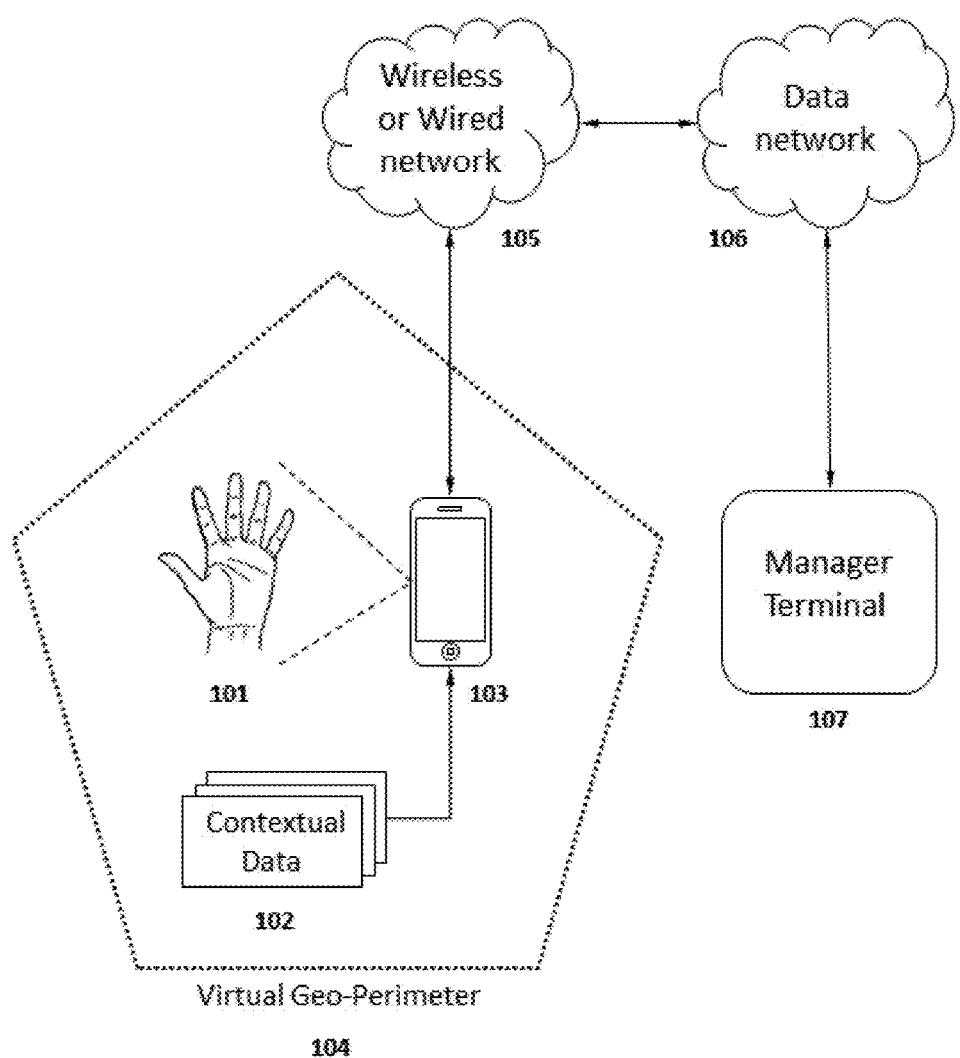
FIG. 1A shows a non-limiting example system of time and attendance authentication, illustrating an embodiment thereof.

Reference will now be made in detail to various exemplary embodiments of the invention. It is to be understood that the following discussion of exemplary embodiments is not intended as a limitation on the invention, as broadly disclosed herein. Rather, the following discussion is provided to give the reader a more detailed understanding of certain aspects and features of the invention.

Before the embodiments of the present invention are described in detail, it is to be understood that the terminology used herein is for the purpose of describing particular embodiments only, and is not intended to be limiting. Unless defined otherwise, all technical terms used herein have the same meaning as commonly understood by one of ordinary skill in the art to which the term belongs. Although any methods and materials similar or equivalent to those described herein can be used in the practice of the present invention, the preferred methods and materials are now described. All publications mentioned herein are incorporated herein by reference to disclose and describe the methods and/or materials in connection with which the publications are cited. The present disclosure is controlling to the extent it conflicts with any incorporated publication.

As used herein and in the appended claims, the singular forms "a", "an", and "the" include plural referents unless the context clearly dictates otherwise. Thus, for example, reference to "a palm" includes a single palm or both palms of an individual and reference to "an image" includes reference to one or more images. Furthermore, the use of terms that can be described using equivalent terms includes the use of those equivalent terms. Thus, for example, the use of the term "camera" is to be understood to include any device capable of obtaining an image of an object. As another example, the term "smartphone" includes all mobile devices with a digital signal processor.

In various embodiments, the technology described herein includes a computing system of authenticating and processing time and attendance used by a mobile end user, the system comprising: (a) a mobile processor, a memory module and a mobile operating system configured to perform executable instructions; (b) a sensor configured to measure and record a first set of time and attendance data from the mobile end user, the time and attendance data comprising: (1) an identity of the mobile end user, (2) a time of authentication, (3) a geo-location, and (4) ancillary information associated with time and attendance for cost coding or record retention; and (c) a communication module configured to send the first set of the time and attendance data to a database in a server. In some embodiments, the ancillary information comprises a note or a tag. In some embodiments, the server is configured to verify the time and attendance data based on a clock of the server. In some embodiments, the system completes time and attendance authentication of the mobile end user without requesting the mobile end user to actively execute an identifying step, the identifying step comprising one or more of: (a) submitting a name, (b) entering a passcode, (c) swiping a keycard, (d) providing one or more biometric signatures, and (e) submitting a form of identity. In some embodiments, the system further comprises a display configured to display the time and attendance data to the mobile end user. In some embodiments, the system further comprises a camera configured to record biometric information of the mobile end user by taking one or more biometric photographs. In some embodiments, the display is further configured to indicate an action, the action comprising one or more of the following: (a) recording the biometric information of the mobile end user in a simultaneous or near-simultaneous or asynchronous recording and transmittal of a second set of the time and attendance data, (b) pressing a button or touching the display, and (c) speaking one or more sounds. In some embodiments, the executable instructions comprise a determination of the mobile end user being correctly within premises for a time and attendance purpose, the determination comprising: (a) capturing geo-location data comprising free-form geographic coordinates representing a location in the world, and (b) comparing the geo-location data to permitted geo-location data, either locally on the system, or remotely via transmission of the geo-location data to the server. In some embodiments, the permitted geo-location data is provisioned by an additional party in a process comprising: (a) entering of the permitted geo-location data into the database; (b) syncing of the permitted geo-location data with the system. In some embodiments, entering of the permitted geo-location data comprises entering of one or more geographic coordinate points on a digital map on a computer terminal to form a shape encompassing a target area for the permitted geo-location data. In some embodiments, the permitted geo-location data is updated with a new set of permitted geo-location data and synced real-time with the system, providing a configurable and changing permitted premises for time and attendance authentication. In some embodiments, the determination of the mobile end user being correctly within the premises for the time and attendance purpose further comprises: comparing a proximity of the mobile end user to a permitted user, via geo-location data of two users' mobile devices, or via short-range wireless communication between the two users' mobile devices, enabling a sufficient determination of a permitted proximity. In some embodiments, the determination of the mobile end user being correctly within the premises for the time and attendance purpose further comprises: comparing a proximity of the mobile end user to a permitted sensory device, via geo-location data of the system and the permitted sensory device, or via short-range wireless communication between the mobile end user and the permitted sensory device, enabling a sufficient determination of permitted proximity. In some embodiments, the geo-location data: (a) is created via a clock of the mobile end-use for the time and attendance purpose automatically, and (b) creates a geo-fence perimeter around the mobile end user, wherein the mobile end user is allowed to clock out simply by physically exiting outside geographic coordinates defined by the geo-fence perimeter, without having to actively enter his or her clock out instructions. In some embodiments, geo-location data creates a geo-fence perimeter around the mobile end user, wherein the mobile end user is allowed to clock out simply by physically exiting specific geo-location based conditions without having to actively enter his or her clock out instructions, including but not limited to: (a) exiting outside geographic coordinates defined by a geo-fence perimeter; (b) exiting outside the wireless signal range of a sensory device; (c) exiting beyond a predefined distance from another mobile device as measured by a signal between the devices. In some embodiments, the geo-location is checked at a regular interval or at a random interval, the checking of the location executed as part of an anti-spoofing process to ensure the mobile user remains compliant with a premises requirement based on one or more of the following: a time-denominated rule, and a location-denominated rule. In some embodiments, the server comprises a smartphone, a tablet or a notebook, a stationary computing device, or a desktop. In some embodiments, the time and attendance data is synchronized with a database in a third computing device. In some embodiments, the third computing device comprises a manager of a workforce, the manager allowing a user of the third computing device to perform one or more of the following: (a) viewing the time and attendance data; (b) communicating directly with the mobile end user; and (c) triggering a time and attendance authentication directly to the mobile end user. In some embodiments, the time and attendance data is real-time updated or regularly-updated.

In various embodiments, the technology described herein includes a method of authenticating and processing time and attendance implemented by a mobile computing system and used by a mobile end user, the method comprising: (a) measuring and recording, by a sensor, a first set of time and attendance data from the mobile end user, the time and attendance data comprising: (1) an identity of the mobile end user, (2) a time of authentication, (3) a geo-location, and (4) ancillary information associated with time and attendance for cost coding or record retention; and (b) sending, by a communication module, the first set of the time and attendance data to a database in a server. In some embodiments, the ancillary information comprises a note or a tag. In some embodiments, the server is configured to verify the time and attendance data based on a clock of the server. In some embodiments, the method further comprises completing time and attendance authentication of the mobile end user without requesting the mobile end user to actively execute an identifying step, the identifying step comprising one or more of: (a) submitting a name, (b) entering a passcode, (c) swiping a keycard, (d) providing one or more biometric signatures, and (e) submitting a form of identity. In some embodiments, the method further comprises displaying, by a display, the time and attendance data to the mobile end user. In some embodiments, the method further comprises recording, by a camera, biometric information of the mobile end user by taking one or more biometric photographs. In some embodiments, the display is further configured to indicate an action, the action comprising one or more of the following: (a) recording the biometric information of the mobile end user in a simultaneous or near-simultaneous or asynchronous recording and transmittal of a second set of the time and attendance data, (b) pressing a button or touching the display, and (c) speaking one or more sounds. In some embodiments, the method further comprises determining the mobile end user being correctly within premises for a time and attendance purpose, the determination comprising: (a) capturing geo-location data comprising freeform geographic coordinates representing a location in the world, and (b) comparing the geo-location data to permitted geo-location data, either locally on the system, or remotely via transmission of the geo-location data to the server. In some embodiments, the permitted geo-location data is provisioned by an additional party in a process comprising: (a) entering of the permitted geo-location data into the database; (b) syncing of the permitted geo-location data with the system. In some embodiments, entering of the permitted geo-location data comprises entering of one or more geographic coordinate points on a digital map on a computer terminal to form a shape encompassing a target area for the permitted geo-location data. In some embodiments, the permitted geo-location data is updated with a new set of permitted geo-location data and synced real-time with the system, providing a configurable and changing permitted premises for time and attendance authentication. In some embodiments, determining the mobile end user being correctly within the premises for the time and attendance purpose further comprises: comparing a proximity of the mobile end user to a permitted user, via geo-location data of two users' mobile devices, or via short-range wireless communication between the two users' mobile devices, enabling a sufficient determination of a permitted proximity. In some embodiments, the determining the mobile end user being correctly within the premises for the time and attendance purpose further comprises: comparing a proximity of the mobile end user to a permitted sensory device, via geo-location data of the system and the permitted sensory device, or via short-range wireless communication between the mobile end user and the permitted sensory device, enabling a sufficient determination of permitted proximity. In some embodiments, the geo-location data: (a) is created via a clock of the mobile end-use for the time and attendance purpose automatically, and (b) creates a geo-fence perimeter around the mobile end user, wherein the mobile end user is allowed to clock out simply by physically exiting outside geographic coordinates defined by the geo-fence perimeter, without having to actively enter his or her clock out instructions. In some embodiments, geo-location data creates a geo-fence perimeter around the mobile end user, wherein the mobile end user is allowed to clock out simply by physically exiting specific geo-location based conditions without having to actively enter his or her clock out instructions, including but not limited to: (a) exiting outside geographic coordinates defined by a geo-fence perimeter; (b) exiting outside the wireless signal range of a sensory device; (c) exiting beyond a predefined distance from another mobile device as measured by a signal between the devices. In some embodiments, the geo-location is checked at a regular interval or at a random interval, the checking of the location executed as part of an anti-spoofing process to ensure the mobile user remains compliant with a premises requirement based on one or more of the following: a time-denominated rule, and a location-denominated rule. In some embodiments, the server comprises a smartphone, a tablet or a notebook, a stationary computing device, or a desktop. In some embodiments, the time and attendance data is synchronized with a database in a third computing device. In some embodiments, the third computing device comprises a manager of a workforce, the manager allowing a user of the third computing device to perform one or more of the following: (a) viewing the time and attendance data; (b) communicating directly with the mobile end user; and (c) triggering a time and attendance authentication directly to the mobile end user. In some embodiments, the time and attendance data is real-time updated or regularly-updated.

System Design

FIG. 1A is an example system of time and attendance authentication under the present invention. This embodiment supports single-action time and attendance over the Internet using a computing device. In a synchronous or near-synchronous process, user 101 authenticates his or her biometric data via a mobile device 103, the mobile device 103 captures contextual data 102, which may include time data, geo-location data based on geographic coordinates, geo-location data based on a measurement of proximity to other devices via short-range signals exchanged between the devices, a note or tag to be associated with said time and attendance data for the purpose of attributing a specific hourly rate or other form of cost code to the data or for associating an informational note with the data for other archival or record retention purposes, and the time and attendance data is sent to manager terminal 107 via wireless or wired network 105 and data network 106. In a preferred embodiment, the authentication of biometric data occurs via biometric matching of the palm modality of user 101, with the unique features of the palm of user 101 captured via an image or set of images from the optical camera of mobile device 103. Manager terminal 107 can provision a virtual geo-fence perimeter 104, and associate virtual geo-fence perimeter 104 as the permitted premises for authenticating time and attendance by user 101. As such, when user 101 attempts to authenticate his or her time and attendance data, a matching of geo-location data between user 101 and mobile device 103 with virtual geo-perimeter 104 can be made, with compliance allowing submission of the time and attendance data to manager terminal 107, and non-compliance triggering the rejection of the submission of time and attendance data.

Figure 1B:
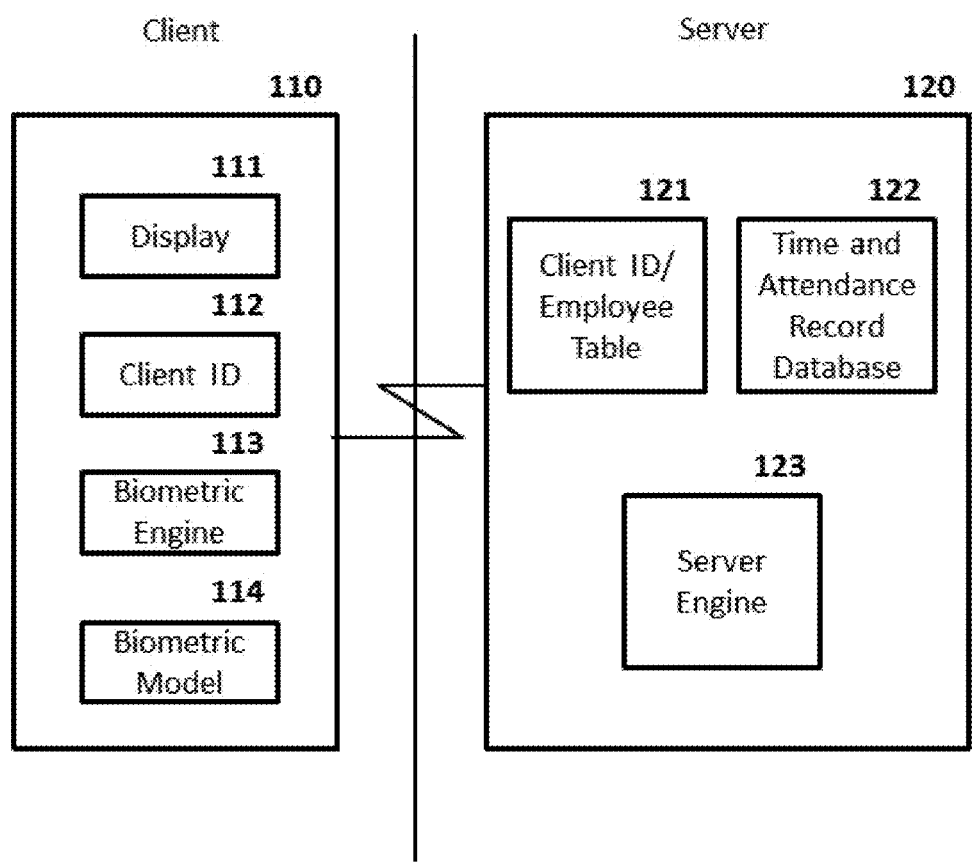
FIG. 1B shows a non-limiting example of a block diagram, illustrating an embodiment thereof.

FIG. 1B is a block diagram illustrating an embodiment of the present invention. The server system 120 includes a client ID/employee table 121, a time and attendance record database 122, and a server engine 123. The client ID/Employee table contains a map of each employee to a unique ID number. The time and attendance record database 122 contains a list of previous records generated by each employee. The server engine 123 receives record generation requests and returns confirmation when a record has been generated. The client system 110 contains a display 111, a client ID 112, a biometric engine 113, and a biometric model 114. The display may show the employee the current status of the computing device. If a record was just generated, the display may show a confirmation. The client ID 112 stores the unique identifier for a given employee. The biometric system 113 transforms a given biometric reading into a client signature. This signature is then compared to the biometric model 114 to confirm or deny the identity of the individual attempting to generate a record. As will be apparent to one of skill in the art, the comparison and matching functions for user identity may be implemented either on the client system 110, on the server system 120, or alternately between client system 110 and server system 120, with biometric engine 113, biometric model 114, client ID/employee table 121, and time and attendance record database 122 operating on any one device, both devices, or some combination of devices. It should further be apparent to one of skill in the art that the functions performance by server system 120 could alternately be performed by any computing device, including but not limited to smartphones, tablets, notebooks, desktops, or any variety of other mobile or stationary computing device.

Contextual Data

Referring to FIG. 1A, in some embodiments, the system transmits contextual data for time and attendance management. Contextual data comprises data or information associated with a condition where a user is using the system.

In various implementations, contextual data comprises geo-location data of an end user, e.g., a house number, a unit number, a building, a center, a bank, a fitness center, an enterprise, a firm, a company, a hotel, a clinic, a medical center, a hospital, a school, a university, a government agency, a library, a station, a road crossing, a landmark, an attraction, a hotel, a theater, a street, a county, a city, a geographic region, a country, a continent, an aerospace, etc.

In some applications, contextual data comprises device information, e.g., an IP address, browser, a user ID, a timestamp, an operating system, a device type, a device manufacturer, network connectivity, a network carrier, a network type, etc.

An example of contextual data includes vehicles a user is taking, e.g., a public transportation system, a personal automobile, a motorcycle, a taxi, a car, a bicycle, a bus, a train, a tram, a boat, a ship, an airplane, shuttle, etc.

Another example includes activities that a user is doing or participating, e.g., a breakfast, a lunch, a dinner, a wedding, a meeting, a conference, a travel, a ceremony, a celebration, a training, a class, an interview, a chat, a phone call, a document preparation, cooking, bathing, showering, sleeping, reading, singing, working, walking, driving, music playing, sports playing, taking a break, seeing, movie-watching, etc.

A person with skills in the art can easily recognize potential variations of contextual data.

Sensor

In various embodiments, the system, device, media, network, and method described herein include a sensor or use of the same. A sensor is able to measure one or more physical signals. In some embodiments, the signals are in a raw form; alternatively, raw signals are processed or cleaned or assembled by the sensor. Non-limiting examples include: one or more video cameras, one or more sound recorders, one or more global positioning systems (GPSs), one or more weather stations, one or more position sensors, one or more RF tags, one or more GPS tracking units, one or more wind speed sensors, wind direction sensors, one or more temperature sensors, one or more rain sensors, one or more snow sensors, one or more liquid sensors, one or more gas sensors, one or more carbon dioxide sensors, one or more carbon monoxide sensors, one or more oxygen sensors, one or more motion sensors, one or more speed sensors, one or more acceleration sensors, one or more pressure sensors, one or more torque sensors, one or more force sensors, one or more load sensors, one or more electric current sensors, one or more electric voltage sensors, one or more stability sensor, and one or more balance sensors.

Time and Attendance Data

In some embodiments, the raw signals collected by one or more sensors are analyzed and processed to generate time and attendance data. In some cases, the data comprises temporal and/or spatial information. In various applications, the data comprises (1) an identity of a mobile end user, (2) a time of authentication, (3) a geo-location, and (4) ancillary information associated with time and attendance for cost coding or record retention.

In some embodiments, the time and attendance data comprises ancillary information, which can include a note, a tag, a mark, a document, a message.

Workforce Manager

In some embodiments, the system and method described herein include a manager of a workforce. In some embodiments, the manager is implemented as one or more software modules, one or more hardware modules, or a combination of thereof. In certain embodiments, the manager allows a user of a third computing device to view the time and attendance data of the mobile user. In various embodiments, the manager allows a user of a third computing device to communicate directly with the mobile user. In some applications, the manager allows a user of a third computing device to trigger a time and attendance authentication directly to the mobile user.

Applications of the System

Based on the above description of the system and methodologies of the present invention, it can be understood that various applications are possible. Examples include, without limitation, recording and managing working hours spent by an employee in a workplace or in a project; authenticating access to a workplace; managing access to a workplace; dismissing an employee from a workplace.

In some embodiments, the system is used to manage time spent to a physical resource, such as a house, an apartment, a hotel room, an office, a building, a facility, a storage unit, an automobile, a bicycle, a motorcycle, an airplane, a helicopter, a remotely operated robot such as a drone, or a maritime vessel.

Digital Processing Device

In some embodiments, the system, media, and method described herein include a digital processing device, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory module. The storage and/or memory module is one or more physical apparatuses used to store data or programs on a temporary or permanent basis. In some embodiments, the module is volatile memory and requires power to maintain stored information. In some embodiments, the module is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory module is a combination of modules such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user.

In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

Non-Transitory Computer Readable Storage Medium

In some embodiments, the system, media, and method disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the system, media, and method disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the system, media, and method disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the system, media, and method disclosed herein include one or more databases, or use of the same. In view of the disclosure provided herein, those of skill in the art will recognize that many databases are suitable for storage and retrieval of biometric information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

EXAMPLES

The following illustrative examples are representative of embodiments of the software applications, systems, and methods described herein and are not meant to be limiting in any way.

Example 1—Time and Attendance Management

Figure 2:
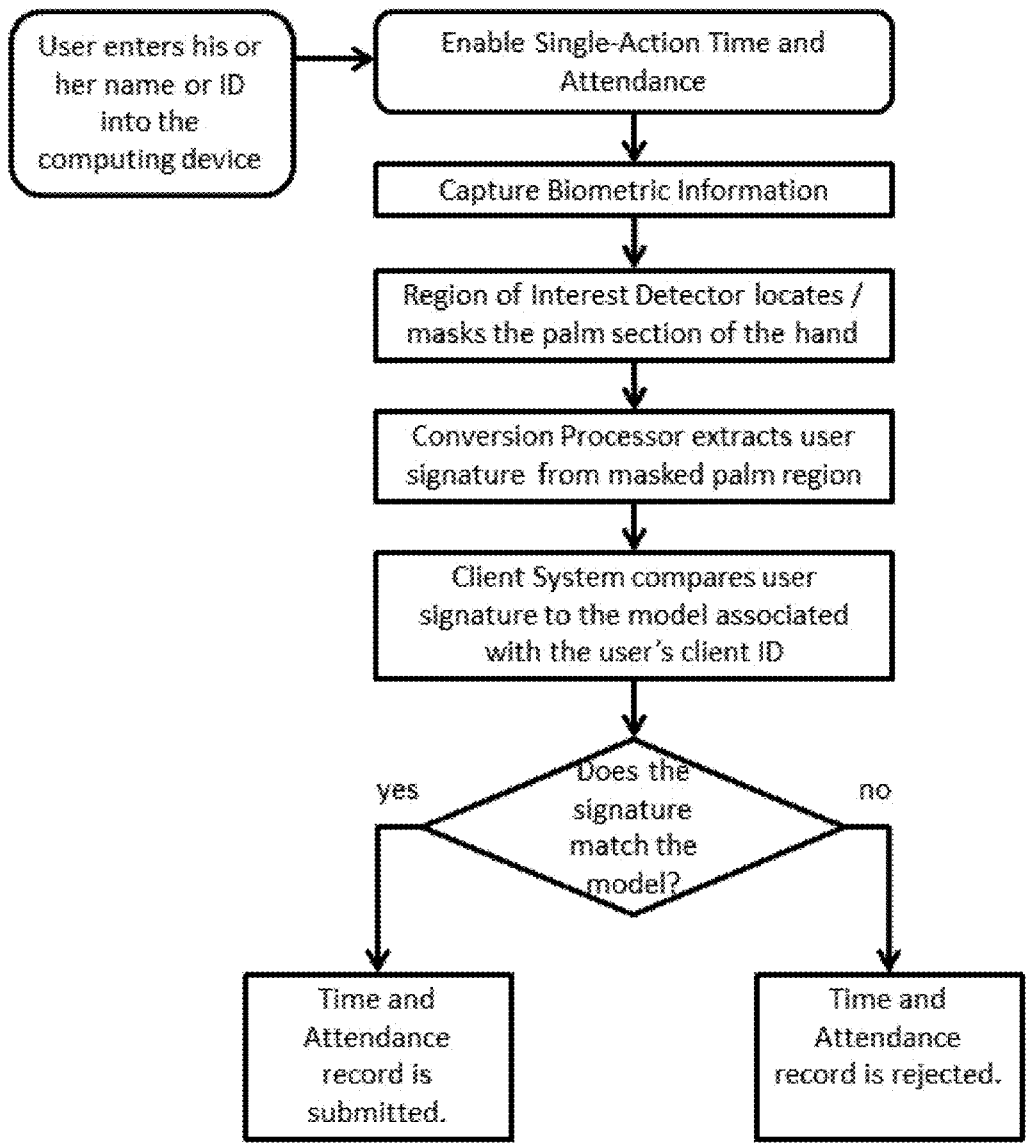
FIG. 2 shows a non-limiting example of a flow chart illustrating key steps in verifying a user's identity for time and attendance record generation.
Figure 3:
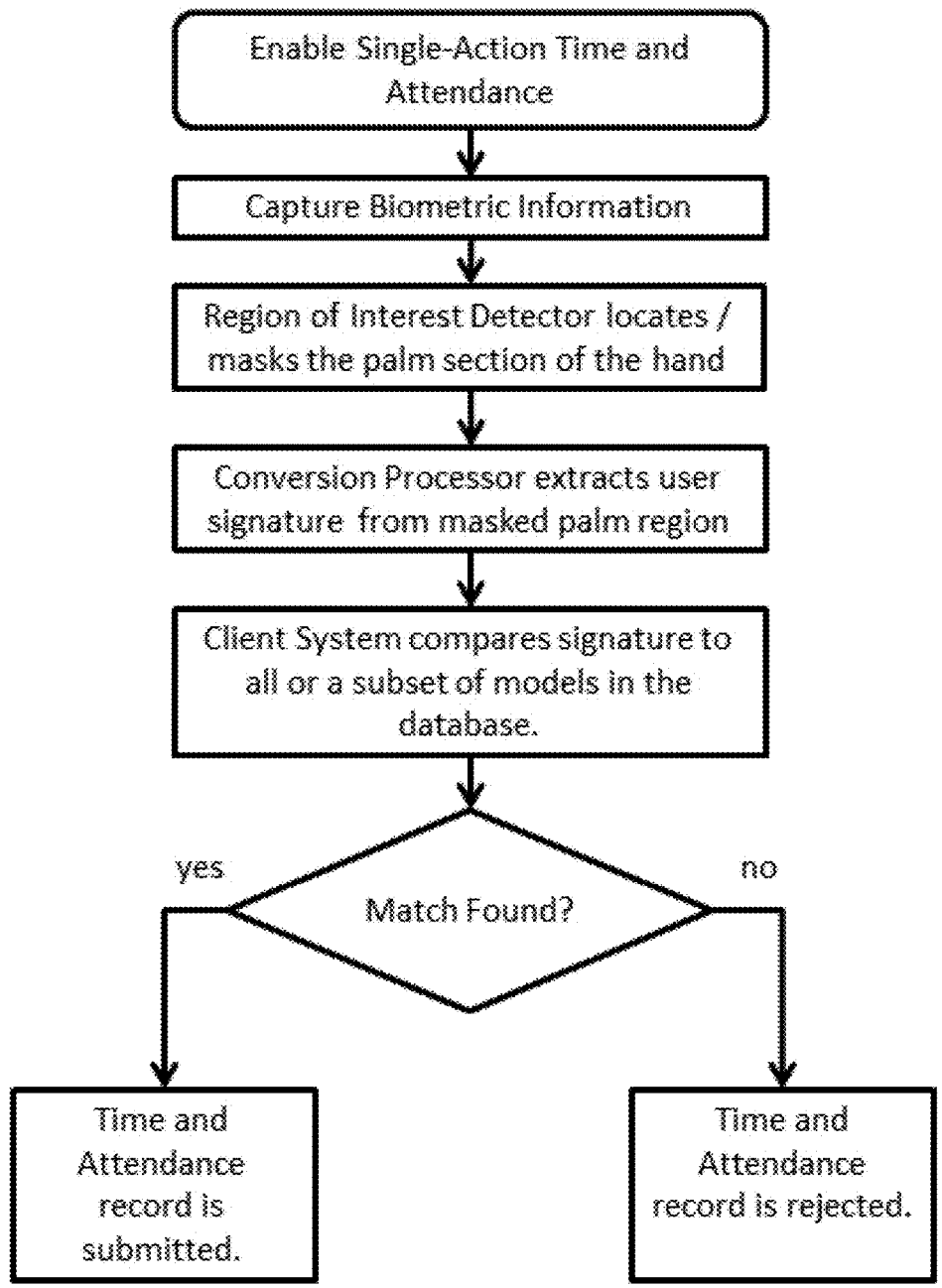
FIG. 3 shows a flow chart illustrating key steps in identifying a user for time and attendance record generation.

FIG. 2 and FIG. 3 are examples of how a user operates the system. In the case of verification (FIG. 2), the user enters his or her name or ID in the mobile device. The single-action time and attendance process is triggered. The mobile device captures the biometric information. Once the biometric information is captured, a detector immediately determines a region of interest in the biometric scan. The device further extracts feature information unique to the user. The system extracts a signature from this feature information and compares the signature and user ID or user name with a model stored in the database. If the match is found, the time and attendance data is sent to the server; otherwise, the time and attendance data is rejected. In the case of identification (FIG. 3), the single-action time and attendance process is triggered and the user identity accepted or rejected without first requiring the user to enter a name or ID in the mobile device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

What is claimed is:

1. A computing system for measuring and authenticating time and attendance of a mobile end user, the system comprising:
   (a) a mobile device comprising:
      (i) a mobile processor;
      (ii) a mobile operating system configured to perform executable instructions;
      (iii) a memory configured to store a classification label comprising a note, a tag, a mark, a document, or a message, or any combination thereof, wherein the label is capable of encoding at least one of a cost data and a categorical data;
      (iv) a sensor configured to measure and record an attendance data comprising a time of authentication and a geo-location of the mobile device;
      (v) a camera configured to record a biometric data of the mobile end user, the biometric data comprising a photograph or a biometric modality of the mobile end user; and
      (vi) a communication module configured to send the attendance data, and the biometric data to a server; and
   (b) the server configured to:
      (i) confirm that the time of authentication matches a clock of the server;
      (ii) confirm that the biometric data matches a biometric model of the mobile end user;
      (iii) determine a position of the mobile device by comparing the geo-location to a geo-location of a permitted mobile device, via short-range wireless communication or a geo-location of a permitted sensory device, via short-range wireless communication;
      (iv) confirm that the time of authentication and the position are compliant with at least one of a time-denominated rule and a location-denominated rule; and
      (v) send a confirmation to the mobile device;
   wherein the mobile device is configured to periodically measure and record at least one of the time of authentication, the geo-location, and the biometric data,
   wherein the server is configured to periodically confirm that the time of authentication and the position are compliant with at least one of the time-denominated rule and the location-denominated rule as an anti-spoofing measure to ensure that the mobile user remains compliant; and
   wherein the mobile operating system is further configured to assign the classification label to at least one of the attendance data and the biometric data; and
   wherein the system is capable of confirming the time of authentication and the position are compliant with at least one of the time-denominated rule and the location-denominated rule without receiving a name, a passcode, a keycard data, a signature, or a form of identity.

2. The system of claim 1, wherein the mobile device further comprises at least one of: a display configured to display at least one of the confirmation, the position, the attendance data, and a current status to the end user, a button, a touch sensitive display, or a microphone.

3. The system of claim 1, wherein the location-denominated rule comprises determining whether the position is within a set of geographic coordinates representing an area in the world.

4. The system of claim 3, wherein the server is further configured to receive at least one of:
   (a) the set of geographic coordinates; and/or
   (b) an updated set of geographic coordinates in real-time to provide a configurable location-denominated rule.

5. The system of claim 4, wherein the set of geographic coordinates comprises of one or more geographic coordinate points on a digital map, which form a shape encompassing the area in the world.

6. The system of claim 1, wherein the server is further configured to:
   clock out the mobile end user if at least one of the time of authentication and the position are not compliant with at least one of the time-denominated rule and the location-denominated rule, wherein the server is configured to clock out of the mobile end user without the mobile end user actively entering a clock out instruction into the mobile device.

7. The system of claim 1, further comprising a managing module configured to:
   (a) display at least one of the attendance data, the confirmation, the position, and a current status;
   (b) communicate a message directly with the mobile device; or
   (c) confirm that the time of authentication and the position are compliant with at least one of the time-denominated rule and the location-denominated rule.

8. A method of measuring and authenticating time and attendance of a mobile end user, implemented by a computing system, the method comprising:
   (a) measuring and recording, by a sensor of a mobile device, an attendance data comprising a time of authentication and a geo-location;
   (b) recording, by a camera of the mobile device, a biometric data of the mobile end user, the biometric data comprising a photograph or a biometric modality of the mobile end user;
   (c) storing, by a memory of the mobile device, a classification label comprising a note, a tag, a mark, a document, a message, or any combination thereof, wherein the classification label is capable of encoding at least one of a cost data and a categorical data;
   (d) assigning, by the mobile device, the classification label to at least one of the attendance data and the biometric data;
   (e) sending, by a communication module of the mobile device, the attendance data, the biometric data, and the classification label to a server;
   (f) confirming, by the server, that the time of authentication matches a clock of the server;
   (g) confirming, by the server, that the biometric model matches a biometric model of the mobile end user;

(h) determining, by the server, a position of the mobile end user by comparing the geo-location to a geo-location of a permitted mobile device via short-range wireless communication or a geo-location of a permitted sensory device via short-range wireless communication;

(i) confirming, by the server, that the time of authentication and the position are compliant with at least one of a time-denominated rule and a location-denominated rule without the mobile end user submitting a name, a passcode, a keycard data, a signature, or a form of identity;

(j) sending, by the server, a confirmation to the mobile device, if the compliance is verified; and (k) periodically measuring and recording at least one of the time of authentication, the geo-location, and the biometric data, and periodically confirming that the time of authentication and the position are compliant with at least one of the time-denominated rule and the location-denominated rule, as an anti-spoofing measure to ensure that the mobile user remains compliant.

9. The method of claim 8, further comprising at least one of:

(a) displaying, by a display, at least one of the attendance, the position, and a current status; and (b) receiving, by the mobile device, a button input, a touch display input, or a sound.

10. The method of claim 8, wherein confirming, by the server, that the position is compliant with the location-denominated rule comprises confirming whether the position is within a set of geographic coordinates representing an area in the world.

11. The method of claim 10, further comprising at least one of:

(a) receiving, by the server, the set of geographic coordinates into the database; and (b) updating in real-time, by the server, the set of geographic coordinates to provide a configurable location-denominated rule.

12. The method of claim 11, wherein the receiving, by the server, the set of geographic coordinates comprises receiving of one or more geographic coordinate points on a digital map which form a shape encompassing the area of the world.

13. The method of claim 10, further comprising the server clocking, by the server, out the mobile end user if at least one of the time of authentication and the position are not compliant with at least one of the time-denominated rule and the location-denominated rule without the mobile end user actively entering clock out instructions into the mobile device.

14. The method of claim 8, further comprising:

(a) displaying, by a managing module, at least one of the attendance data, the confirmation, a current status, and the position;

(b) communicating, by the managing module, a message directly with the mobile device; or (c) confirming, by the managing module, that the time of authentication and the position are compliant with at least one of the time-denominated rule and the location-denominated rule.

\* \* \* \* \*